United States Patent
Barta et al.

(10) Patent No.: US 6,195,606 B1
(45) Date of Patent: Feb. 27, 2001

(54) VEHICLE ACTIVE BRAKE CONTROL WITH BANK ANGLE COMPENSATION

(75) Inventors: David John Barta; Aleksander Boguslaw Hac, both of Dayton, OH (US)

(73) Assignee: General Motors Corporation, Detriot, MI (US)

(*) Notice: Subject to any disclaimer, the term of this patent is extended or adjusted under 35 U.S.C. 154(b) by 0 days.

(21) Appl. No.: 09/207,012

(22) Filed: Dec. 7, 1998

(51) Int. Cl.[7] .............................. G06F 7/70; G06G 7/76
(52) U.S. Cl. .............................. 701/70; 701/72; 701/82; 701/90; 303/140; 303/146; 303/150
(58) Field of Search .................... 701/70, 71, 72, 701/76, 82, 74, 36, 37, 73, 90, 91, 80; 303/140, 146, 148, 116.2; 180/422, 197, 421

(56) References Cited

U.S. PATENT DOCUMENTS

| 4,834,205 | 5/1989 | Mizuno et al. ............... 180/141 |
| 5,063,514 | 11/1991 | Headley et al. .............. 701/73 |

(List continued on next page.)

FOREIGN PATENT DOCUMENTS

| 41 23 235 C1 | 11/1992 | (DE) . |
| 41 21 954 A1 | 1/1993 | (DE) . |
| 42 00 061 A1 | 7/1993 | (DE) . |
| 42 23 385 A1 | 1/1994 | (DE) . |
| 42 29 504 A1 | 3/1994 | (DE) . |
| 43 11 077 A1 | 10/1994 | (DE) . |
| 43 14 827 A1 | 11/1994 | (DE) . |
| 0 555 860 A1 | 8/1993 | (EP) . |
| 2 275 551 | 1/1993 | (GB) . |
| 2 263 340 | 7/1993 | (GB) . |
| 2 269 571 | 2/1994 | (GB) . |
| 2 275 312 | 8/1994 | (GB) . |
| 40 52 62213 | 10/1993 | (JP) ........................... B60T/8/32 |
| 40 60 24304 | 2/1994 | (JP) ........................... B60T/8/24 |
| 40 60 87421 | 3/1994 | (JP) ........................... B60T/8/32 |
| 40 61 15418 | 4/1994 | (JP) ........................... B60T/8/24 |
| 40 61 27354 | 5/1994 | (JP) ........................... B60T/8/24 |

OTHER PUBLICATIONS

May the Cornering Force Be With You; Popular Mechanics; Dec. 1995, pp. 74–77.
Stable as She Goes: Don Sherman, Automotive Industries, May 1995.
The Spin Doctors: Don Sherman, 12PS95.
Mercedes/Bosch ESP; Automotive Industries, Apr. 1995.
Controlling Vehicle Stability; Christopher A. Sawyer, Automotive Industries, Jan. 1995.

(List continued on next page.)

Primary Examiner—Jacques H. Louis-Jacques
(74) Attorney, Agent, or Firm—Robert M. Sigler

(57) ABSTRACT

An improved active brake control method which compensates for the effects of a banked road surface under both steady state and transient operating conditions of the vehicle. The control includes an observer for estimating the lateral velocity of the vehicle as a means of determining vehicle slip angle, and a time derivative of the estimated lateral velocity is used along with measured values of lateral acceleration, vehicle speed and yaw rate to compute the lateral acceleration component due to the banked road surface, referred to as the bank acceleration. The bank acceleration, in turn, is then used to correct the values of measured steering angle and the measured lateral acceleration used (1) to develop the desired yaw rate, slip angle and lateral acceleration, and (2) to estimate the surface coefficient of adhesion and slip angle. Partial compensation can be achieved by applying suitable gain factors to the computed bank acceleration, if desired.

10 Claims, 8 Drawing Sheets

U.S. PATENT DOCUMENTS

| | | | |
|---|---|---|---|
| 5,172,961 | | 12/1992 | Inoue et al. .......................... 303/146 |
| 5,229,944 | | 7/1993 | Yasuno ................................. 701/70 |
| 5,275,475 | | 1/1994 | Hartmann et al. .................. 303/146 |
| 5,311,431 | | 5/1994 | Cao et al. ............................. 701/72 |
| 5,341,296 | * | 8/1994 | Yasuno et al. ....................... 701/70 |
| 5,341,297 | | 8/1994 | Zomotor et al. .................... 701/172 |
| 5,366,281 | | 11/1994 | Littlejohn .............................. 303/3 |
| 5,402,342 | | 3/1995 | Ehret et al. ............................ 701/1 |
| 5,428,532 | * | 6/1995 | Yasuno ................................. 701/48 |
| 5,444,621 | | 8/1995 | Matsunaga et al. .................. 701/37 |
| 5,446,658 | * | 8/1995 | Pastor et al. ........................... 701/1 |
| 5,480,219 | | 1/1996 | Kost et al. ........................... 303/146 |
| 5,702,165 | * | 12/1997 | Koibuchi ............................ 303/146 |
| 5,720,533 | | 2/1998 | Pastor et al. ........................ 303/147 |
| 5,742,919 | * | 4/1998 | Ashrafi et al. ........................ 701/70 |
| 5,746,486 | | 5/1998 | Paul et al. ........................... 303/146 |
| 5,869,753 | * | 2/1999 | Asanuma et al. .................. 73/117.3 |
| 5,882,092 | * | 3/1999 | Koibuvhi ............................ 303/146 |
| 5,931,887 | * | 8/1999 | Hac ....................................... 701/71 |
| 5,964,819 | * | 10/1999 | Naito ..................................... 701/72 |
| 6,035,251 | * | 3/2000 | Hac et al. .............................. 701/70 |
| 6,112,147 | * | 8/2000 | Ghoneim et al. ..................... 701/80 |
| 6,122,584 | * | 9/2000 | Lin et al. .............................. 701/70 |
| 6,125,319 | * | 9/2000 | Hac et al. .............................. 701/80 |
| 6,973,065 | * | 6/2000 | Brown et al. ......................... 701/36 |

OTHER PUBLICATIONS

Let Magic Fingers Do the Driving: Wards Auto World; May 1995.

Technoid: Intelligent Brakes Are on the Way; Car and Driver, Aug. 1994.

Toyota Vehicle Stability Control System; Automotive Engineering, Aug. 1995.

Vehicle Dynamics Offers New Level of Safety: Machine Design, Sep. 1994.

Handling Control Systems for Your Car: Popular Electronics; Feb. 1995.

VDC, the Vehicle Dynamics Control System of Bosch: A. VanZanten, R. Erhardt and G. Pfaff; Robert Bosch GmbH; No. 950759, pp. 9–26. No Date.

Active Stability Control; Junichi Kubokawa, Aisin Seiki Co., Ltd., Electronics & Brake Division; Abstract; Sep. 1995.

Consideration of Lateral and Longitudinal Vehicle Stability by Function Enhanced Brake and Stability Control System; Heinz Leffler; SAE #940832; Feb. 28 –Mar. 3, 1994.

Control of Vehicle Dynamics: Automotive Engineering; pp. 87–93; May 1995.

Improvement of Vehicle Maneuverability by Direct YAW Moment Control; Y. Shibahata, K. Shimada and T. Tomari; Society of Automotive Engineers of Japan, Inc.; pp. 464–481, 1993.

Spin Control for Cars; Steven Ashley; Mechanical Engineering; pp. 66–68; Jun. 1995.

* cited by examiner

VEHICLE ACTIVE BRAKE CONTROL WITH BANK ANGLE COMPENSATION

TECHNICAL FIELD

This invention relates to a vehicle active brake control that compensates for the bank angle of a road surface.

BACKGROUND OF THE INVENTION

Chassis control technology has achieved noteworthy progress, thanks to advancements in sensing and computing technologies as well as advances in estimation and control theory. This has permitted the design of various control systems using active means to maneuver the vehicle. One such enhancement is the control and adjustment of the tire forces through a braking force distribution control strategy, using a steering angle sensor, a lateral accelerometer, and a yaw rate sensor to enable a yaw rate feedback control.

The measured values of both lateral acceleration and steering angle are influenced by the bank angle of the road surface; the lateral accelerometer senses a bank-related component of gravity force, and the measured steering angle includes a bank-related steering correction necessary to maintain the intended travel path. It is known, as described in the U.S. Pat. No. 5,720,533 to Pastor et. al., issued on Feb. 24, 1998, and assigned to the assignee of the present invention, that a bank angle compensation term can be computed as a function of the measured lateral acceleration and yaw rate if steady state operating conditions are assumed. Additionally, the compensation can be estimated as a function of yaw rate error in systems that lack a lateral accelerometer, as described in U.S. Ser. No. 09/134954, filed on Aug. 17, 1998, now U.S. Pat. No. 6,112,147 also assigned to the assignee of the present invention. What is desired is a method of compensating a vehicle yaw rate control for operation on a banked surface during both transient and steady state operating conditions.

SUMMARY OF THE INVENTION

The present invention is directed to an improved active brake control method which compensates for the effects of a banked road surface under both steady state and transient operating conditions of the vehicle. The control includes an observer for estimating the lateral velocity of the vehicle as a means of determining vehicle slip angle, and a time derivative of the estimated lateral velocity is used along with measured values of lateral acceleration, vehicle speed and yaw rate to compute the lateral acceleration component due to the banked road surface, referred to herein as the bank acceleration. The bank acceleration, in turn, is then used to correct the values of measured steering angle and the measured lateral acceleration used (1) to develop the desired yaw rate, slip angle and lateral acceleration, and (2) to estimate the surface coefficient of adhesion and slip angle. Partial compensation can be achieved by applying suitable gain factors to the computed bank acceleration, if desired.

DESCRIPTION OF THE PREFERRED EMBODIMENT

Figure 1:
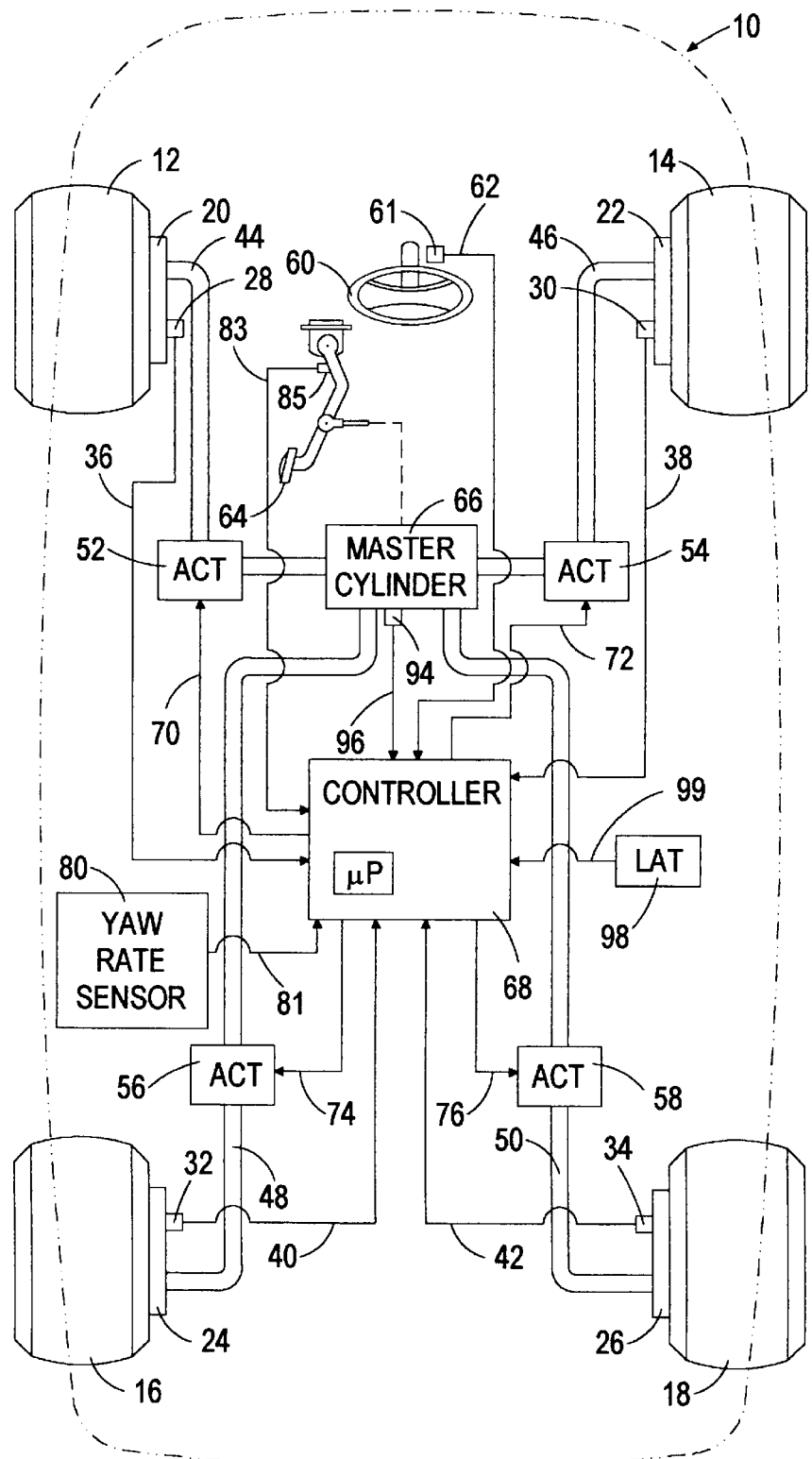
FIG. 1 is a diagram of a vehicle including an electronic controller and associated input and output devices constituting a control system for carrying out an active brake control.

FIG. 1 depicts a mechanization of a brake control according to this invention on a vehicle 10. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal travel signal on line 83 from pedal travel sensor 85; a steering wheel angle signal on line 62 from angle sensor 61; a yaw rate signal on line 81 from yaw rate sensor 80; a master cylinder pressure signal on line 96 from the pressure sensor 94; and a lateral acceleration signal on line 99 from the lateral accelerometer 98. The sensors 28, 30, 32, 34, 61, 80, 85, 98 may be implemented with conventional devices in a manner known to those skilled in the art.

Under certain conditions such as wheel lock-up or spinning, or lateral instability, the controller 68 modifies the normal braking of one or more wheel 12, 14, 16, 18 via the respective actuators 52, 54, 56, 58 in order to restore a desired overall operation of the vehicle. In an incipient lock-up condition, the controller 68 commands one or more of the respective actuator(s) 52, 54, 56, 58 to modulate the brake force developed at the wheel(s) experiencing the condition. In a wheel spin condition, the controller 68 commands one or more of the respective actuator(s) 52, 54, 56, 58 to develop brake force at the spinning wheel(s). In a case of lateral instability, the controller 68 commands one or more of the respective actuator(s) 52, 54, 56, 58 to selectively increase or decrease the brake forces generated at the various wheels 12, 14, 16, 18 to bring the vehicle yaw rate and slip angle into conformance with the desired yaw rate and slip angle; the control may be carried in a two-channel system in which only the front brakes 20, 22 are controlled, or a four-channel system in which all four brakes 20, 22, 24, 26 are controlled. Exemplary actuators are shown and described in detail in the U.S. Pat. No. 5,366,291, assigned to the assignee of the present invention.

Figure 2:
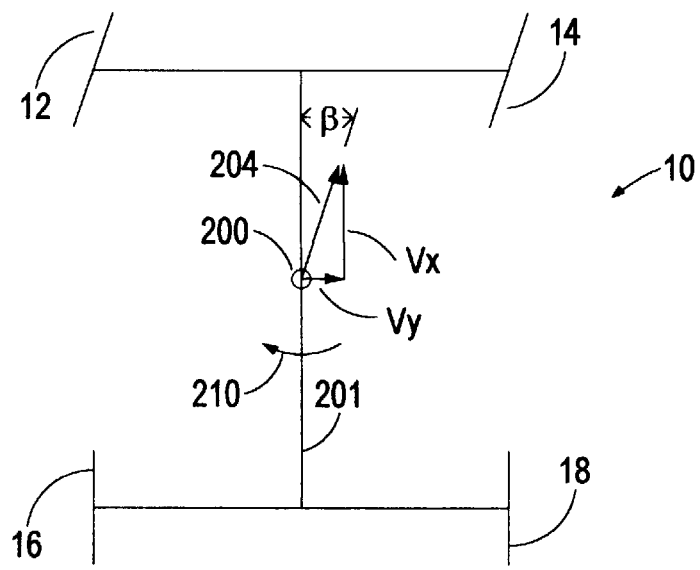
FIG. 2 is a vector diagram of a vehicle for defining yaw rate and side slip concepts.

FIG. 2 schematically depicts the vehicle 10 in a turning maneuver, and illustrates the concepts of slip angle and yaw rate control. The longitudinal, or x-axis of the vehicle is designated by the reference numeral 201, and the vector 204 designates the velocity of the vehicle's center of gravity 200, which has longitudinal velocity component $V_x$ and lateral (or side-slip) velocity component $V_y$. The vector 204 deviates from the x-axis 201 by an angle β known as the vehicle side slip angle. The reference numeral 210 designates the yaw rate Ω, which is the velocity of rotation about the vertical axis of vehicle, measured by the sensor 80 of FIG. 1.

During linear operation of the vehicle 10, the yaw rate Ω and slip angle β have fixed relationships to the steering wheel angle and the forward or longitudinal velocity $V_x$. In non-linear operation, the tires experience significant lateral motion with respect to the road surface, and the above-described relationships become no longer fixed. When controller 68 recognizes that the yaw rate or slip angle relationships are becoming non-linear, it applies braking forces to counteract an undesired yaw moment, or possibly reduces braking forces to introduce a yaw moment.

In the illustrated embodiment, the control is carried out as a function of vehicle speed (which may be determined from the four wheel speed sensors), driver steering angle, the measured lateral acceleration and yaw rate, and a braking indication (which may be determined by the master cylinder brake pressure or by brake pedal travel or switch). Using these inputs, the controller 68 determines a desired vehicle yaw rate, a desired lateral acceleration, and a desired slip angle. The desired yaw rate is compared with the measured yaw rate to determine yaw rate error, and the desired slip angle is compared with an estimated slip angle to determine slip angle error. If the determined yaw rate and/or slip angle errors exceed respective threshold amounts, the controller 68 determines and outputs commands to actuators 52, 54, 56, 58 to control the wheel brakes 20, 22, 24, 26 so as to counter the determined error(s). In a two channel system, only brakes 20 and 22 are controlled via actuators 52 and 54.

Figure 3:
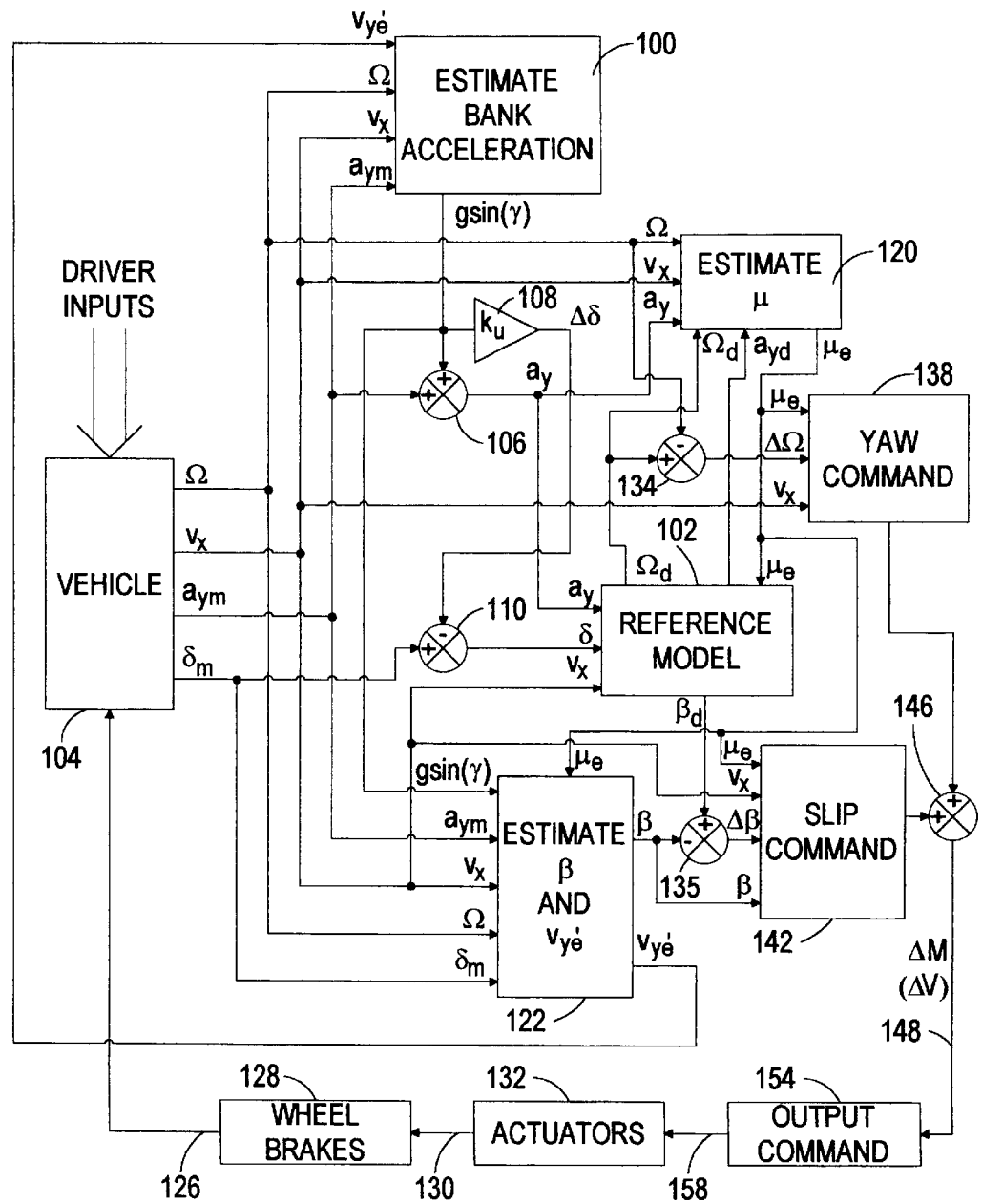
FIG. 3 is a block diagram of the active brake control system of FIG. 1, including a bank acceleration estimator in accordance with this invention.

FIG. 3 depicts a block diagram of a lateral stability brake control incorporating a bank acceleration estimator 100 according to this invention. In addition, the diagram includes a reference model 102, a surface coefficient of adhesion estimator 120, a slip angle and lateral velocity estimator 122, yaw and slip command blocks 138 and 142, and output command block 154. The vehicle is designated by the block 104, and the brake actuators and brakes are designated generally by the blocks 132 and 128.

As indicated above, the measured values of both lateral acceleration and steering angle are influenced by the bank angle γ of the road surface; the lateral accelerometer senses a bank-related component of gravity force, $g*\sin(\gamma)$, and the measured steering angle $\delta_m$ includes a bank-related steering correction Δδ necessary to maintain the intended travel path. During driving on a banked road, the measured lateral acceleration $a_{ym}$ at the vehicle center of gravity is given by $$a_{ym}=a_y-g*\sin(\gamma)=V_y'+V_x*\Omega-g*\sin(\gamma) \quad (1)$$

where $a_y$ is the lateral acceleration component due to cornering and $g*\sin(\gamma)$ is the bank acceleration. As indicated in the right-hand side of equation (1), $a_y$ may be expressed as $V_y'+V_x*\Omega$, where $V_y'$ is the time derivative of the vehicle lateral velocity expressed in terms of the vehicle reference frame, and Ω is the vehicle yaw rate. Thus, the bank acceleration $g*\sin(\gamma)$ may be computed as a function of the measured yaw rate Ω, the measured longitudinal velocity $V_x$ and the time derivative of the estimated lateral velocity $V_{ye}$, in accordance with the expression:

$$g*\sin(\gamma)=V_{ye}'+V_x*\Omega-a_{ym} \quad (2)$$

As indicated in FIG. 3, the bank acceleration $g*\sin(\gamma)$ is summed with the measured lateral acceleration $a_{ym}$ at summing junction 106 to form the compensated lateral acceleration $a_y$, and is multiplied by an understeer coefficient $K_u$ at block 108 to form a bank-related steering angle correction Δδ which is subtracted from the measured steering angle $\delta_m$ at summing junction 110 to form the compensated steering angle δ. The compensated lateral acceleration $a_y$ and steering angle δ are supplied as inputs to the reference model 102, and the compensated lateral acceleration $a_y$ is additionally supplied as an input to the surface coefficient estimator 120. Also, the bank acceleration $g*\sin(\gamma)$ is supplied as an input to the slip angle and lateral velocity estimator 122. Further detail regarding the development of the bank acceleration $g*\sin(\gamma)$ is given below in reference to the flow diagram of FIG. 5, and further detail regarding the application of the compensated lateral acceleration $a_y$ and steering angle δ in the reference model block 102 and estimator blocks 120 and 122 is given below in reference to the respective blocks.

In addition to the compensated lateral acceleration $a_y$ and steering angle δ, the vehicle reference model 102 receives inputs representing longitudinal velocity $V_x$ and estimated surface coefficient of adhesion $\mu_e$. While various reference models may be employed in the control, the reference model 102 according to a preferred embodiment of this invention uses the above mentioned inputs to calculate raw values of the desired slip angle $\beta_d$, the desired lateral velocity $V_{yd}$, and the desired yaw rate $\Omega_d$, according to the following equations:

$$V_{yd}(k)=(1+c_{11}*\Delta t)*V_{yd}(k-1)+c_{12}*\Delta t*\Omega_d(k-1)+b_1*\Delta t*\delta, \quad (3)$$

$$\Omega_d(k)=c_{21}*\Delta t*V_{yd}(k-1)+(1+c_{22}*\Delta t)*\Omega_d(k-1)+b_2*\Delta t*\delta, \text{ and} \quad (4)$$

$$\beta_d=\text{Arctan}(V_{yd}/V_x) \quad (5)$$

where Δt is the sampling period (control loop time). The coefficients $c_{11}$, $c_{12}$, $c_{21}$, $c_{22}$, $b_1$ and $b_2$ are given according to the expressions:

$$c_{11}=-(c_{of}+c_{or})/(M*V_x), c_{12}=(-c_{of}*a+c_{or}*b)/(M*V_x)-V_x, c_{21}=(-c_{of}*a+c_{or}*b)/(I_{zz}*V_x), \quad (6)$$

$$c_{22}=(-c_{of}*a^2-c_{or}*b^2)/(I_{zz}*V_x),$$

$$b_1=c_{of}/M, \text{ and}$$

$$b_2=a\ c_{of}/I_{zz}$$

where M is the vehicle mass, $I_{zz}$ is the moment of inertia about the yaw axis through the center of gravity 200, a and b are distances from the center of gravity 200 to the front and rear axles of the vehicle, $c_{of}$ and $c_{or}$ are the cornering stiffness coefficients of both tires of the front and rear axles, respectively, in the linear range of tire operation. Additionally, the time designation (k) indicates a current control loop value, whereas the time designation (k−1) indicates the previous control loop value. The current control loop value is assumed where not specifically designated.

The reference model 102 then limits the raw values of desired slip angle and yaw rate. The desired slip angle $\beta_d$ is limited as a function of the estimated surface coefficient of adhesion $\mu_e$, the value of which typically ranges from 0.2 (ice) to 1.0 (dry pavement). For example, the design engineer may want to choose maximum desired slip angles $\beta_{max}$ for the various adhesion conditions; for example, 4° for ice and 10° for dry pavement, the desired slip angle for intermediate coefficients of adhesion being determined by interpolation. The desired slip angle may be limited only if the vehicle speed is above a certain value or the steering wheel angle δ has a sign opposite to that of the raw desired slip angle. Analogously, the desired yaw rate $\Omega_d$ may be limited based on the maximum yaw rate sustainable by a given vehicle on dry pavement, with more severe limiting at progressively higher vehicle speeds.

The desired lateral acceleration $a_{yd}$ may be determined as:

$$a_{yd}=V_{yd}'+V_x*\Omega_d \qquad (7)$$

where $V_{yd}'$ is the first derivative with respect to time of the desired lateral velocity $V_{yd}$, and may be computed as:

$$V_{yd}'=c_{11}*V_{yd}+c_{12}*106_d+b_1*\delta, \text{ or} \qquad (8)$$

$$V_{yd}'=[V_{yd}(k)-V_{yd}(k-1)]/\Delta t \qquad (9)$$

Referring again to FIG. 3, block 120 estimates the surface coefficient of adhesion $\mu_e$ as a function of the desired lateral acceleration $a_{yd}$, the bank-compensated lateral acceleration $a_y$, desired yaw rate $\Omega_d$, the measured yaw rate $\Omega_a$, and the vehicle speed $V_x$. Initially, the bank-compensated lateral acceleration $a_y$ is multiplied by a roll factor $r_{fac}$ to compensate for the effect of roll during turning maneuvers. The roll factor $r_{fac}$ may be determined as:

$$r_{fac}=1/(1+M*g*h/\phi_s) \qquad (10)$$

where g is the gravity acceleration, h is the height of the vehicle center of gravity 200 and $\phi_s$ is the total roll stiffness of the vehicle suspension. For a typical sedan, the roll factor has a value of approximately 0.9. Additionally, the measured lateral acceleration is subjected to a low pass filter to suppress sensor noise.

The bank-compensated and desired lateral acceleration values $a_y$ and $a_{yd}$ are then subjected to a low pass filter to suppress sensor noise, and the desired lateral acceleration $a_{yd}$ is further filtered with a second order low pass filter to form a filtered desired lateral acceleration value $a_{ydfl}$. Finally, $a_{ydfl}$ is limited to $\pm a_{ymax}$, the maximum lateral acceleration sustainable on dry pavement (8 m/sec$^2$, for example). The filtered lateral acceleration values are then used to compute the lateral acceleration error $\Delta a_y$ according to the expression:

$$\Delta a_y=|a_{ydfl}-a_y| \qquad (11)$$

The lateral acceleration error $\Delta a_y$ is then subjected to a low pass filter, forming the term $\Delta a_{yf}$.

An estimate of the lateral surface coefficient of adhesion based on the bank-compensated lateral acceleration, designated as $\mu_{ay}$, is determined as:

$$\mu_{ay}=|a_y|/a_{ymax} \qquad (12)$$

if the measured yaw rate and bank-compensated lateral acceleration values indicate that the vehicle has deviated significantly from the linear reference model and the vehicle is approximately in a steady state condition. If the measured values indicate that the vehicle is operating in substantial agreement with the linear reference model, the term $\mu_{ay}$ is reset to a default value of 1.0. If none of the above conditions is satisfied, a previous value of the estimated surface coefficient is being held. The estimated lateral surface coefficient $\mu_e$ is computed as:

$$\mu_e=(0.85+0.15\mu_{ay})*\mu_{ay} \qquad (13)$$

where the parameters 0.85 and 0.15 are calibrated for a given type of vehicle. Finally, the computed value of $\mu_e$ is limited to a minimum value of approximately 0.07, and to a maximum value of 1.0. The surface estimate $\mu_e$ is supplied to the slip angle estimator 122, and a filtered version of $\mu_e$, designated as $\mu_{ef}$, is provided as an input to reference model 102, yaw command block 138, and slip command block 142.

Block 122 estimates the side slip angle of the vehicle with a nonlinear dynamic observer in which the measured yaw rate and lateral acceleration and the estimated bank acceleration are used to correct estimates developed by the model, thereby compensating for external disturbances and deviations between the model and the actual system.

Assuming a small steering angle $\delta$, the dynamics of a bicycle model in a horizontal plane can be described by the following equations:

$$V_y'=-V_x*\Omega+(F_{yf}+F_{yr})/M+g*\sin(\gamma) \text{ and} \qquad (14)$$

$$\Omega'=(a*F_{yf}-b*F_{yr})/I_{zz} \qquad (15)$$

where $V_y$ is the lateral velocity, and $F_{yf}$ and $F_{yr}$ are the lateral forces of the front and rear axles, respectively. The lateral forces $F_{yf}$ and $F_{yr}$ depend on the tire slip angles $\alpha_f$ and $\alpha_r$. They initially rise nearly linearly with slip angle, and then saturate at a value proportional to the coefficient of adhesion when the limit of adhesion is reached. Also, the slip angle at saturation is smaller on low coefficient surfaces than on high coefficient surfaces. To capture these properties, they are preferably modeled at each axle by the combination of a parabolic segment and a straight line, as a function of slip angle and the estimated coefficient of adhesion $\mu_e$.

The following equations also hold true for the bicycle model:

$$V_{y-aym}'=-V_x*\Omega+g*\sin(\gamma) \text{ and} \qquad (16)$$

$$a_y=(F_{yf}+F_{yr})/M \qquad (17)$$

The above-described bicycle model equations are used to develop the observer:

$$V_{ye}'=-V_x*\Omega+(F_{yfe}+F_{yre})/M+g_1*[\Omega_a'-(a*F_{yfe}-b*F_{yre})/I_{zz}]-g_2[V_{ye}'-a_{ym}+V_x*\Omega_a-g*\sin(\gamma)]-g_3*\Delta a_y-g_4*\Delta a_{yf}+g*\sin(\gamma) \qquad (18)$$

where the subscript "e" designates an estimated value, and the subscript "a" or "m" designates an actual or measured value, and the observer gains are designated as $g_1$, $g_2$, $g_3$ and $g_4$. The term $\Delta a_y$, given as $[a_{ym}-(F_{yfe}+F_{yre})/M]$, is the difference between the measured lateral acceleration $a_{ym}$ and a lateral acceleration predicted from the lateral forces, and the term $\Delta a_{yf}$ is a filtered version of $\Delta a_y$. The first two terms comprise an open loop dynamic model of the vehicle responsive to the measured yaw rate and vehicle speed and the estimated tire forces; the term $g_1$ is multiplied by the yaw rate error, $g_2$ is multiplied by the lateral acceleration error, $g_3$ is multiplied by $\Delta a_y$ and $g_4$ is multiplied by $\Delta a_{yf}$. The gains $g_1$, $g_2$, $g_3$ and $g_4$ are tuning parameters preset by a system designer, typically through routine experimentation on a test vehicle, and may vary from implementation to implementation.

Differentiation of the yaw rate is avoided by defining a variable q as follows:

$$q=(1+g_2)*V_{ye}-g_1*\Omega_a \qquad (19)$$

so that the observer may be expressed in the form:

$$q'=-(1+g_2)*V_x*\Omega_a+[(1+g_3)/M-a*g_1/I_{zz}]*F_{yfe}+[(1+g_3)/M+b*g1/I_{zz}]*F_{yre+(g2-g3)}*a_{ym}-g_4*\Delta a_{yf}+(1+g_2)*g*\sin(\gamma) \qquad (20)$$

The above equation is easily converted to discrete form, and estimates of the lateral velocity $V_{ye}$ and slip angle $\beta_e$ are obtained from the equations:

$$V_{ye}=(q+g_1*\Omega_a)/V_x \quad (21)$$

$$\beta_e=\text{Arctan}(V_{ye}/V_x). \quad (22)$$

The time derivative $V_{ye}'$ of the lateral velocity $V_{ye}$, used in the determination of bank acceleration, is obtained by passing the lateral velocity $V_{ye}$ through a high pass filter; for example, a filter with a transfer function of $[a_f*s/(s+a_f)]$, where $a_f$ is a constant, for example, $a_f=16$.

In a practical mechanization of the above-described observer, the front and rear tire side slip angles $\alpha_{fe}$ and $\alpha_{re}$ can be estimated based on the last estimate of lateral velocity, the actual yaw rate, vehicle speed and measured steering angle, as follows:

$$\alpha_{fe}=[V_{ye}(k-1)+a*\Omega_a]/V_x-\delta_m, \text{ and} \quad (23)$$

$$\alpha_{re}=[V_{ye}(k-1)-b*\Omega_a]/V_x. \quad (24)$$

The corresponding lateral forces $F_{yfe}$ and $F_{yre}$ can then be computed as follows:

$$F_{yfe} = \begin{cases} -c_f*\alpha_{fe}*(1-b_{cf}*|\alpha_{fe}|/\mu_e) & \text{if } |\alpha_{fe}| < \mu_e*\alpha_{f*} \\ \text{or} \\ -N_{f*}*(|\alpha_{fe}|/\alpha_{fe})*[\mu_e+s_f*(|\alpha_{fe}|/\alpha_{f*}-\mu_e)] & \text{if } |\alpha_{fe}| \geq \mu_e*\alpha_{f*} \end{cases} \quad (25)$$

$$F_{yre} = \begin{cases} -c_r*\alpha_{re}*(1-b_{cr}*|\alpha_{re}|/\mu_e) & \text{if } |\alpha_{re}| < \mu_e*\alpha_{r*} \\ \text{or} \\ -N_{r*}*(|\alpha_{re}|/\alpha_{re})*[\mu_e+s_r*(|\alpha_{re}|/\alpha_{r*}-\mu_e)] & \text{if } |\alpha_{re}| \geq \mu_e*\alpha_{r*} \end{cases} \quad (26)$$

where $c_f$ and $c_r$ are the cornering stiffness coefficients for both tires of the front and rear axles, respectively, in the linear range of operation. These values may be the same or slightly lower than the coefficients $c_{of}$ and $c_{or}$ used in the reference model equation (6).

In the expressions for $F_{yfe}$, $s_f$ is defined as the slope of $F_{yf}$ vs. $\alpha_f$ curve at the limit of adhesion, $\alpha_{f*}$ is defined as $1/(2*b_{cf})$, $b_{cf}$ is defined as $c_f/(4*N_{f*})$, and $N_{f*}$ is defined as:

$$N_{f*}=M*b*(a_{ymax}+\Delta_a)/(a+b) \quad (27)$$

where $a_{ymax}$ is the maximum lateral acceleration that the vehicle can sustain on a dry surface, and $\Delta_a$ is a constant, such as 0.5 m/s².

Similarly, in the expressions for $F_{yre}$, $s_r$ is defined as the slope of $F_{yf}$ vs. $\alpha_f$ curve at the limit of adhesion, $\alpha_{r*}$ is defined as $1/(2*b_{cr})$, $b_{cr}$ is defined as $c_r/(4*N_{r*})$, and $N_{r*}$ is defined as:

$$N_{r*}=M*a*(a_{ymax}+\Delta_a)/(a+b). \quad (28)$$

The system state value $q(k)$ is then computed according to the equation:

$$q(k)=q(k-1)+\Delta t*\{-(1+g_2)*V_x*\Omega a+((1+g_3)/M-a*g_1/I_{zz})*F_{yfe}+[(1+g_3)/M+b*g_1/I_{zz}]*F_{yre}+(g_2-g_3)*a_{ym}-g_4*\Delta a_{yf}+(1+g_2)*\sin(\gamma)\} \quad (29)$$

Referring again to FIG. 3, the desired yaw rate $\Omega_d$ and the actual yaw rate $\Omega_a$ are compared at block 134 to form a yaw rate error signal $\Delta\Omega$ which is provided as an input to yaw command block 138. Similarly, the desired slip angle $\beta_d$ and the estimated slip angle $\gamma_e$ are compared at block 135 to form a slip angle error signal $\Delta\beta$ which is provided as an input to slip command block 142. The yaw rate and slip angle commands are then summed at block 146 to form an overall command $\Delta M$ for Output Command block 154. The overall command $\Delta M$ is a corrective yaw moment applied to the vehicle; alternatively, as explained below, a difference in velocity $\Delta V$ between left and right wheels may be used.

The yaw rate and slip angle command blocks 138 and 142 determine yaw rate and slip angle commands by applying suitable proportional and derivative gain terms to the respective error signals. The preliminary slip angle proportional gain $k_{\beta p}'$ varies as a function of vehicle speed $V_x$ and the estimated lateral surface coefficient of adhesion $\mu_e$. In general, $k_{\beta p}'$ increases with decreasing values of $\mu_e$, and increases with increasing values of $V_x$ up to a threshold speed, such as 20 m/sec. In practice, the gain may be implemented mathematically, or through the use of a look-up table.

Additional gain factors $f_1$ and $f_2$ specific to the slip and yaw command blocks 142 and 138 control the relative influence or authority of the slip and yaw blocks on the overall command $\Delta M$. The factor $f_1$ is computed as:

$$f_1=(k_{off}+k_{mult}*|\beta_e|/\beta_{max})^2 \quad (30)$$

where $k_{off}$ and $k_{mult}$ are tuning parameters having example values of 1.0 and 0.5, respectively. The factor $f_1$ increases in value as the estimated slip angle $\beta_e$ approaches or exceeds the maximum allowable limit $\beta_{max}$, and is limited to a maximum value, such as 4.0. The proportional and derivative slip angle gains $k_{\beta p}$ and $k_{\beta d}$ are determined as:

$$k_{\beta p}=c_1*f_1*k_{\beta p}', \text{ and} \quad (31)$$

$$k_{\beta d}=c_{\beta d}*k\beta p \quad (32)$$

where $c_1$ is a tuning constant and $c_{\beta d}$ is the ratio between the differential and proportional gains (0.7, for example).

Similarly, the gain factor $f_2$ for the yaw rate block 138 is computed as:

$$f_2=1.25*[(c_2-0.2)+\mu_{ef}*(1-c_2)] \quad (33)$$

where $c_2$ is a fractional calibration constant, such as 0.4. The factor $f_2$ thus decreases in value as the filtered estimated lateral surface coefficient of adhesion $\mu_{ef}$ decreases. The proportional and derivative yaw rate gains $k_{\Omega p}$ and $k_{\Omega d}$ are determined as:

$$k_{\Omega p}=f_2*k'_{\Omega p}, \text{ and} \quad (34)$$

$$k_{\Omega d}=c_{\Omega d}*k_{\Omega p} \quad (35)$$

where $c_{\Omega d}$ is the ratio between the differential and proportional gains (0.4, for example), and $k'_{\Omega p}$ is a preliminary gain that may be constant or velocity dependent.

Thus, the gain factor $f_1$ operates to increase the slip angle control gains when the vehicle slip angle increases, and the gain factor $f_2$ increases the yaw rate control gains with increasing coefficient of adhesion. This provides an advantageous tradeoff between yaw rate and slip angle control.

The overall control of blocks 134, 135, 138, 142 and 146 in terms of the corrective yaw moment can be given by the expression $$\Delta M=k_{\beta p}*(\beta_d-\beta_e)+k_{\beta d}*(a_y/V_x-\Omega_a)+k_{\Omega p}*(\Omega_d-\Omega_a)+k_{\Omega d}*(\Omega_d-\Omega_a)' \quad (36)$$

The slip angle term $(a_y/V_x-\Omega_a)$ is an estimate of the time derivetive of vehicle slip angle based on the bank-compensated lateral acceleration and the measured yaw rate.

The output command block 154 determines if the vehicle is in an oversteer or an understeer condition. An understeer condition is indicated if the overall error signal ΔM and the steering angle δ have the same sign. An oversteer condition is indicated if ΔM and δ have opposite signs. A deadzone may be employed to stabilize the indication.

The corrective yaw force F is determined as:

$$F = \Delta M/d \tag{37}$$

where d is one-half the track width of the vehicle. The force command F is distributed to the actuators 132 for the various brakes 128 based on the steering angle direction and the driver braking.

In an understeer condition, braking is applied in approximately equal distribution to the inside rear and inside front wheels if there is no driver braking. However, if the estimated lateral force $F_{yre}$ of the rear axle and the steering angle δ have opposite signs, the distribution is biased toward the inside front wheel. If anti-lock braking control is activated for the rear wheels before the desired braking force is developed, the undeveloped portion of the desired braking force is applied to the inside front wheel. If the driver is braking, and anti-lock braking is activated for both front and rear wheels, the brake command for the outside front wheel is reduced to achieve at least a portion of the desired yaw moment.

In an oversteer condition, braking is applied to the outside front wheel only, and may be allowed to exceed the anti-lock braking limit. If the driver is braking, and anti-lock braking control is activated for the inside wheels before the desired braking force is developed, the brake command for the inside rear wheel (and possibly the inside front wheel) is reduced to achieve the desired yaw force.

It will be recognized that the subject invention is not limited to the above-described distribution strategy, and that other distribution strategies, such as described in the pending U.S. patent application Ser. Nos. 08/654,982 and 08/732,582, both of which are assigned to the assignee of this invention, could be utilized alternatively. Additionally, it will be recognized that the slip and yaw commands may be determined in terms of a desired wheel speed difference to be carried by the output command block 154 instead of being determined in terms of the corrective yaw moment.

In any event, braking commands determined by output block 154 are only applied to the actuators 132 once the entry conditions for active brake control are established, and then, only until the exit conditions are established. The entry conditions require that the vehicle speed be above a minimum threshold, such as 5 mph, and either the magnitude of the yaw rate error $|k_{\Omega p} * (\Omega_d - \Omega_a) + k_{\Omega d} * (\Omega_d' - \Omega_a')|$ exceeds a yaw rate error threshold or the magnitude of the total corrective yaw moment $|\Delta M|$ exceeds a threshold. An exit condition is established if vehicle speed drops below the minimum threshold, or if the overall yaw moment $|\Delta M|$ or the magnitude of the yaw rate error, defined as $|\Omega_{error}| = |(\Omega_d - \Omega_a) + k_e * (\Omega_d' - \Omega_a')|$, where $k_e$ is a small positive constant, are below respective thresholds for a predetermined period of time. If an exit condition is established, output control block 154 is disabled, terminating any corrective yaw control. Another example of entry and exit conditions is given in the U.S. patent application Ser. No. 08/732,582, which is assigned to the assignee of this invention.

Figure 4:
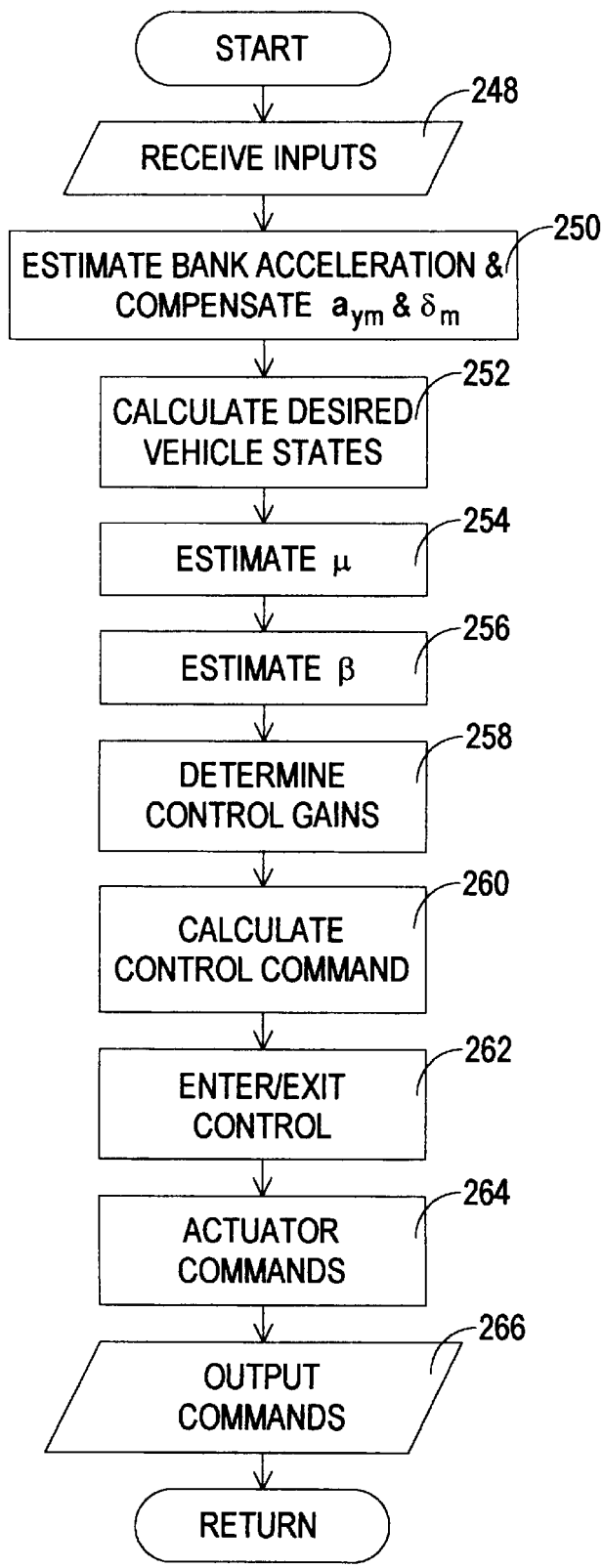
FIG. 4 is a main loop flow diagram representative of computer program instructions executed by the electronic controller of FIG. 1 in carrying out an active brake control in accordance with the block diagram of FIG. 3.

A main flow diagram for the above-described control is set forth in FIG. 4. After reading the various sensor inputs at block 248, the system executes block 250 to estimate the bank acceleration in accordance with equation (2), and to compensate the measured steering angle and lateral acceleration values as described above in reference to FIG. 3. Then block 252 is executed to determine the desired vehicle states, described above in reference to block 102 of FIG. 3. Block 254 estimates the lateral surface coefficient of adhesion $\mu_e$, and block 256 determines the side slip velocity $V_y$ and the slip angle $\beta_e$, using the estimator equation (19) and the relationship $\beta_e = \text{Arctan}(V_y/V_x)$. Blocks 258 and 260 are then executed to determine the control gains and the corrective moment command ΔM. The exit and entrance conditions are established at block 262, and the actuator commands are determined and applied to actuators 132 at blocks 264 and 266.

Figure 5:
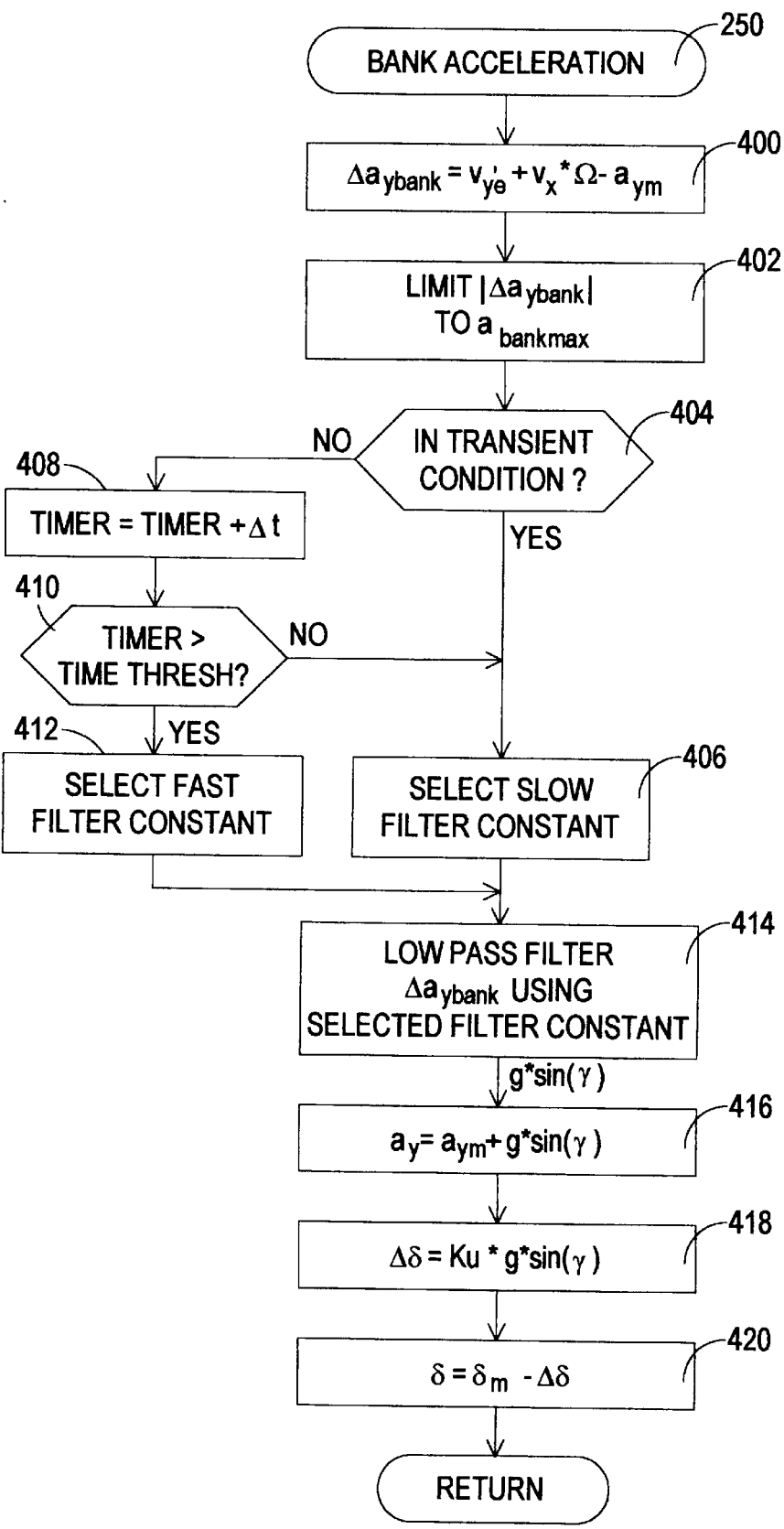
FIG. 5 is a flow diagram detailing a portion of the main flow diagram of FIG. 4 concerning the estimation of bank acceleration and the corresponding compensation of measured lateral acceleration and steering angle.

The flow diagram of FIG. 5 details the main flow diagram block 250, which estimates the bank acceleration and compensates the measured steering angle and lateral acceleration values accordingly. The block 400 is first executed to compute the acceleration difference term $\Delta a_{ybank}$ in accordance with equation (2). The term $\Delta a_{ybank}$ represents an apparent acceleration component due to the bank angle based on the observed imbalance between the measured lateral acceleration $a_{ym}$ and the sum of the estimated lateral velocity derivative $V_{ye}'$ and the product of vehicle speed $V_x$ and yaw rate Ω. At block 402, the magnitude of the computed acceleration value $|\Delta a_{ybank}|$ is limited to a maximum value $a_{bankmax}$ corresponding to a bank angle of about 30 degrees. Blocks 404–414 then apply a variable low pass filter to the limited bank acceleration. Block 404 determines if the vehicle is in a transient state, as may be detected when either the magnitude of yaw rate error defined as $|\Omega_d - \Omega_a|$ exceeds a threshold value such as 4 degrees/sec, or a magnitude of the desired lateral acceleration derivative $|a_{yd}'|$ is above a threshold value such as 10 m/sec². For this purpose, either the desired lateral acceleration from the reference model (equation 7) or a value determined as $V_x^{2*}\delta/[(a+b)+K_u*V_x^2]$ may be used, which is passed through a high pass filter having a transfer function $[a_f*s/(s+a_f)]$, where $a_f$ is a constant having an example value of 12. If the vehicle is in a transient state, the block 406 is executed to select a relatively low gain for the low pass filter. So long as the vehicle is not in a transient state, the blocks 408–410 measure a time interval; when the measured time reaches a threshold (timethresh), the vehicle is assumed to be in a steady state condition and the block 412 is executed to select a relatively high gain for the low pass filter. A typical value of timethresh is 0.5 sec. Once the appropriate gain rate is selected, the block 414 is executed to carry out the low pass filter, for example with a transfer function of $b_f/(s+b_f)$, where $b_f$ is the selected gain. Example values of $b_f$ are 0.4 rad/sec. for the slow filter and 3.1 rad/sec. for the faster filter. Thus, the bank acceleration is updated relatively slowly during quick transient maneuvers, which result in high rates of change in lateral velocity. When the vehicle returns to a steady state condition, the bank acceleration is updated relatively quickly. As a result, the bank acceleration value is less sensitive to errors in estimation of the derivative of lateral velocity, $V_{ye}'$.

The algorithm described above provides full compensation of bank angle. In order to improve stability robustness of the overall algorithm which simultaneously estimates the lateral velocity and bank acceleration, gain factors may be applied to achieve less than full compensation. In this case, the estimated lateral velocity derivative $V_{ye}'$ may be multiplied in block 400 by a gain factor $g_{bank1}$ which is less than one, leading to the following equation for $\Delta a_{ybank}$:

$$\Delta a_{ybank} = g_{bank1}*V_{ye}' + V_x*\Omega_a - a_{ym} \tag{38}$$

Similarly, a gain factor $g_{bank2}$ may be applied to the bank compensation term $g*\sin(\gamma)$ in block 416, and a gain $g_{bank3}$ may be applied to the steering angle correction $\Delta\delta$ in block 418. Example values of the gains are $g_{bank1}=0.7$, $g_{bank2}=0.6$ and $g_{bank3}=0.7$.

The filtered bank acceleration is then added to the measured lateral acceleration $a_{ym}$ to form the bank compensated lateral acceleration term $a_y$, as indicated at block 416. Finally, the blocks 418–420 are executed to form a steering correction $\Delta\delta$ by applying the understeer coefficient $K_u$ to the bank acceleration, and to subtract the correction $\Delta\delta$ from the measured steering angle $\delta_m$ to form the bank compensated steering angle $\delta$.

Figure 6:
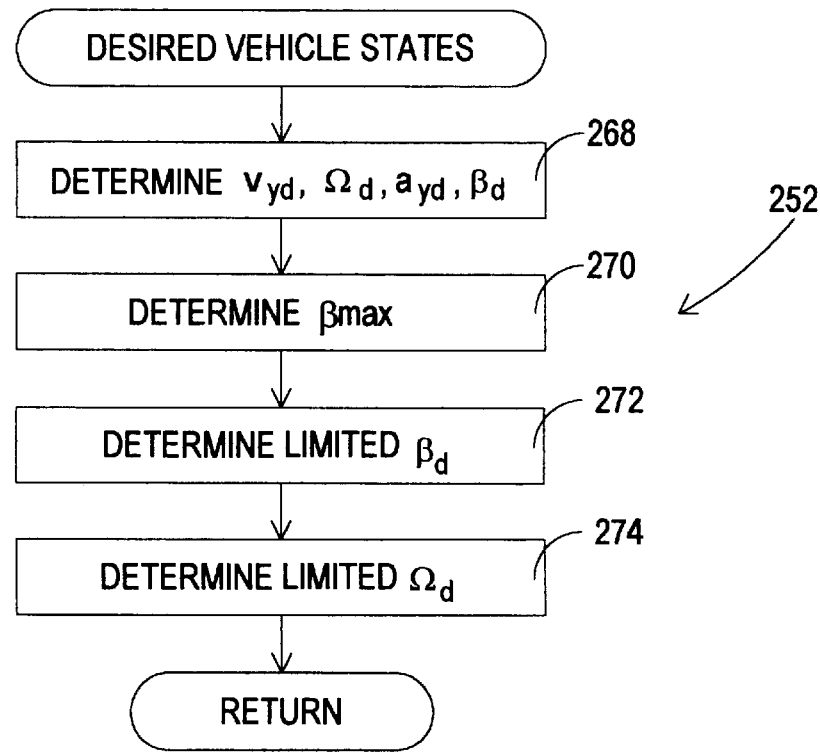
FIG. 6 is a flow diagram detailing a portion of the main flow diagram of FIG. 4 concerning determination of the desired vehicle states.

The flow diagram of FIG. 6 details the main flow diagram block 252, in which the desired vehicle states are determined. At block 268, the vehicle reference model equations are used to determine $V_{yd}$, $a_{yd}$, and the raw values of $\Omega_d$ and $\beta_d$. As indicated above, the bank compensated values of steering angle and lateral acceleration are used in this determination. Then blocks 270–272 are executed to determine $\beta_{max}$ and the limited value of $\beta_d$. Finally, block 274 is executed to suitably limit $\Omega_d$.

Figure 7:
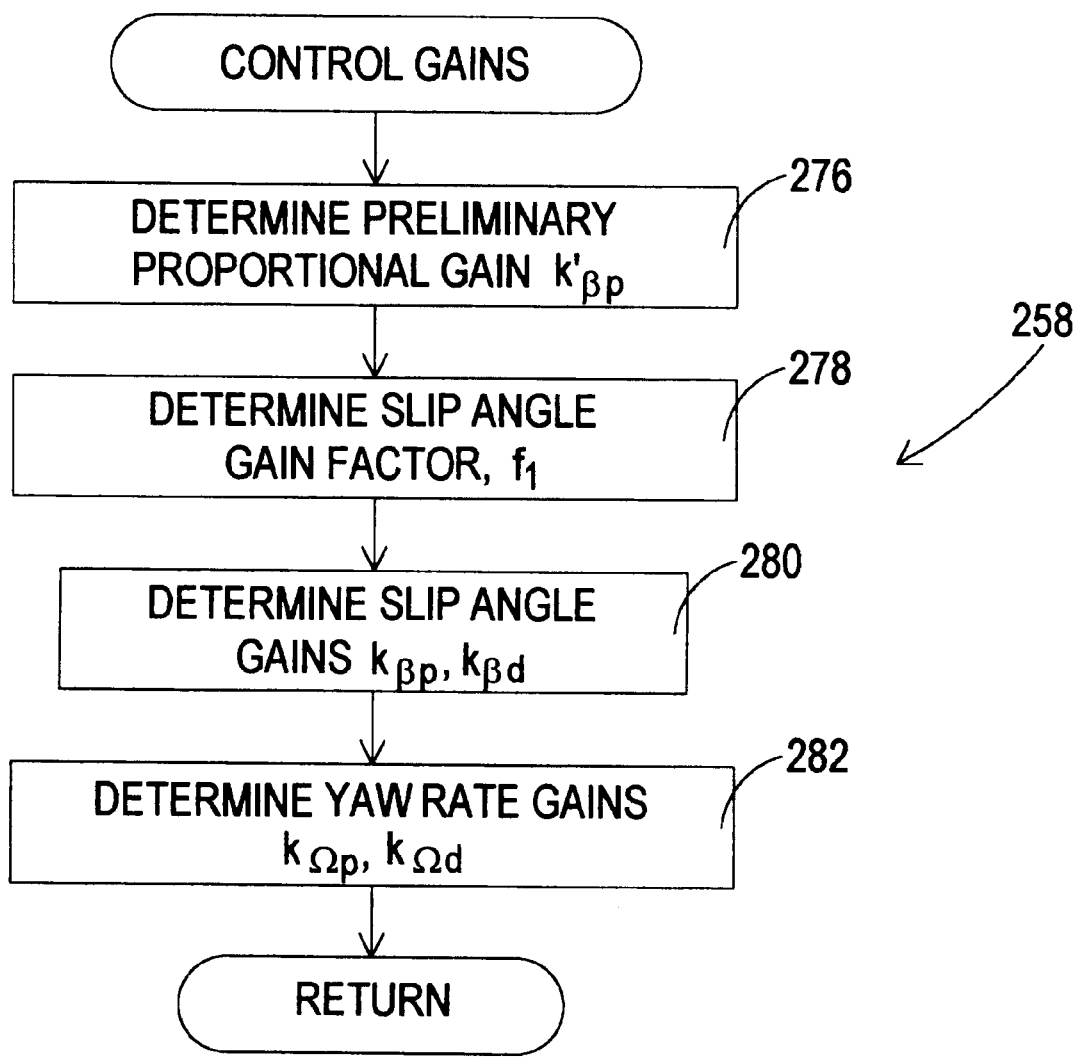
FIG. 7 is a flow diagram detailing a portion of the main flow diagram of FIG. 4 concerning determination of control gains.

The flow diagram of FIG. 7 details the main flow diagram block 258, in which the yaw rate and slip angle control gains are determined. At block 276, the preliminary gain $k_{\beta p}'$ and the slip angle limit $\beta_{max}$ are determined. Then, the gain factor $f_1$ and the slip angle gains $k_{\beta p}$ and $k_{\beta d}$ are determined at blocks 278–280. Finally, the gain factor $f_2$ and the yaw rate gains $k_{\Omega p}$ and $k_{\Omega d}$ are determined at block 282.

Figure 8:
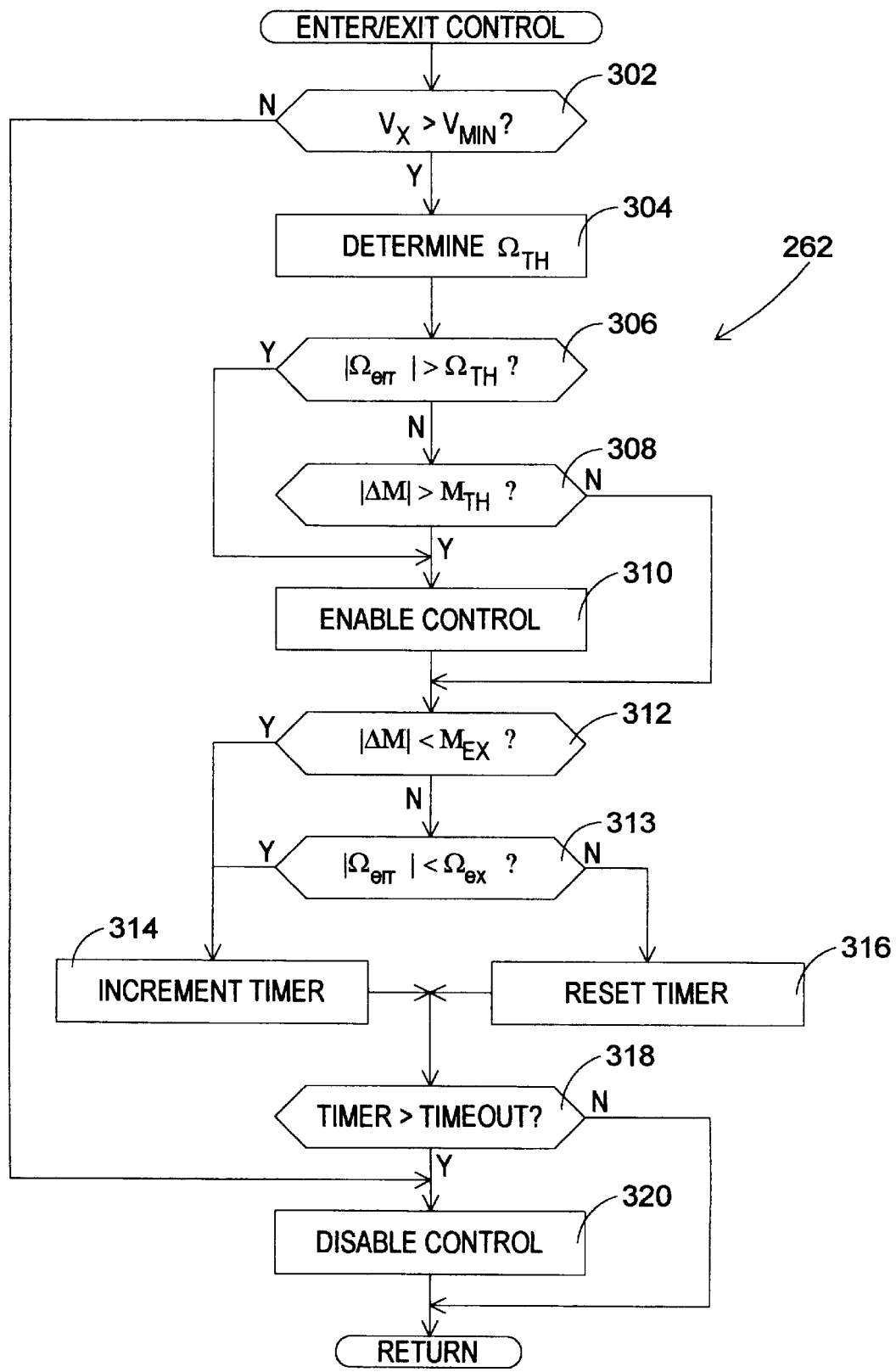
FIG. 8 is a flow diagram detailing a portion of the main flow diagram of FIG. 4 concerning entry/exit conditions.

The flow diagram of FIG. 8 details the main flow diagram block 262, in which the entrance and exit conditions for yaw control are established. If the vehicle velocity $V_x$ is not greater than a minimum velocity threshold $V_{min}$, as determined at block 302, the block 320 is executed to disable active brake control. If $V_x$ is greater than $V_{min}$, blocks 304–306 are executed to determine a threshold yaw rate $\Omega_{th}$, and to compare the yaw error magnitude $|\Omega_{error}|$ to the threshold. If the yaw error exceeds the threshold, block 310 is executed to enable active brake control. Even if the yaw error is less than or equal to the threshold, active brake control is enabled if the corrective moment magnitude $|\Delta M|$ exceeds a threshold moment $M_{th}$, as determined at block 308. Blocks 312–316 are then executed to identify a condition where either the corrective moment magnitude $|\Delta M|$ is less than an exit threshold $M_{ex}$ or the yaw error magnitude $|\Omega_{error}|$ is below an exit yaw threshold $\Omega_{ex}$, and to time the period for which the identified condition is satisfied. If the timed period exceeds reference time (TIMEOUT), as determined at block 318, the block 320 is executed to disable active brake control.

Figure 9:
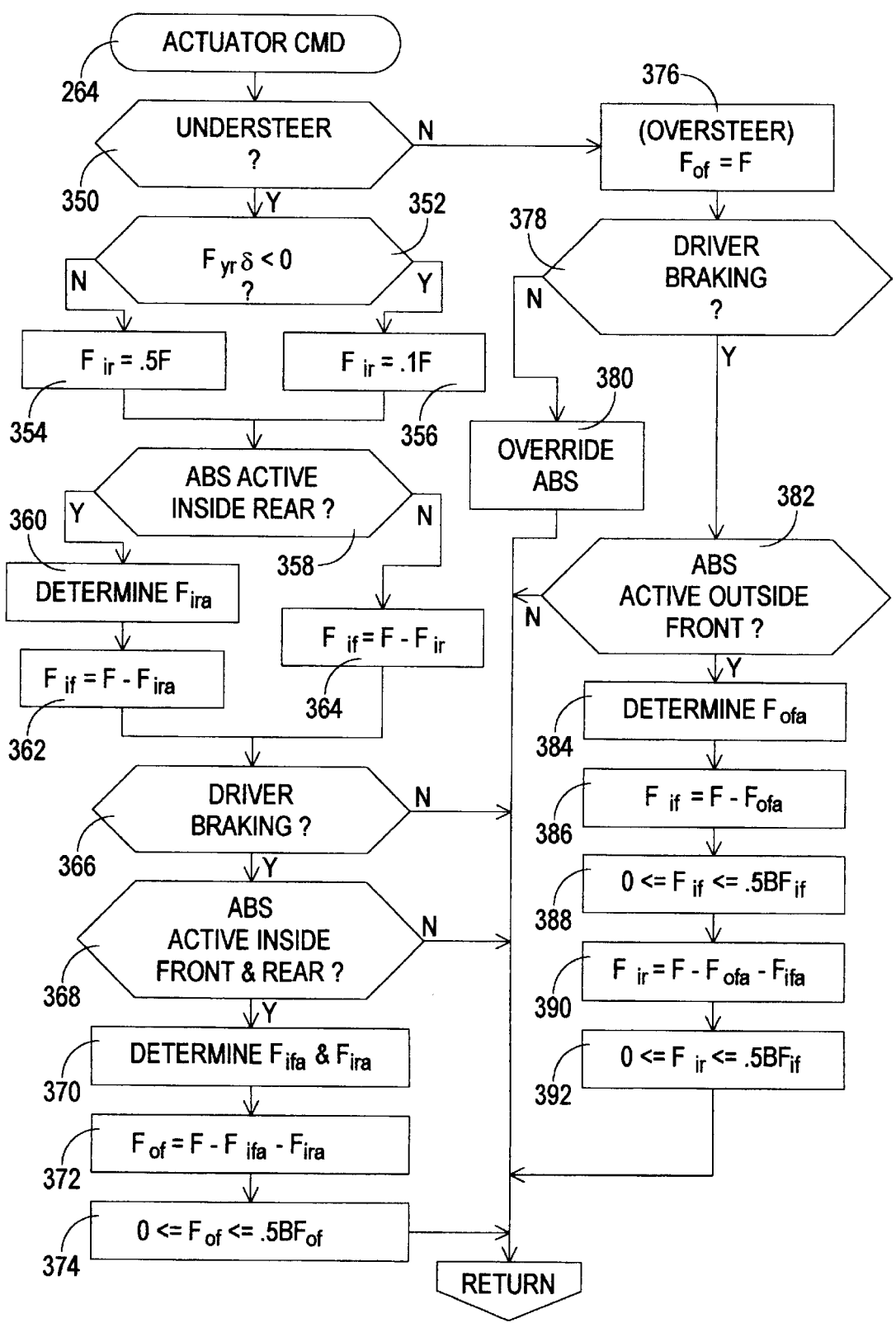
FIG. 9 is a flow diagram detailing a portion of the main flow diagram of FIG. 4 concerning development of actuator commands.

The flow diagram of FIG. 9 details the main flow diagram block 264, in which the actuator commands are developed, assuming a four channel system in which braking forces at the four corners of the vehicle are independently controlled. It is additionally assumed that the control is based on a commanded braking force, as opposed to a commanded wheel speed difference.

If the vehicle is exhibiting understeer, as determined at block 350, the blocks 352–374 are executed to determine the appropriate actuator commands. If the vehicle is exhibiting oversteer, the blocks 376–392 are executed to determine the appropriate actuator commands.

In the understeer condition, the block 352 compares the signs of the estimated lateral force at the rear axle $F_{yr}$ and the steering wheel angle $\delta$ by comparing the product $F_{yr}\delta$ to zero. If the product is less than zero, the signs are opposite, and block 356 is executed to set the inside rear force command $F_{ir}$ to 10% of the total corrective force F; otherwise, block 354 sets the inside rear force command $F_{ir}$ to 50% of the total corrective force F. If anti-lock brake (ABS) control is activated for the inside rear wheel, as determined at block 358, block 360 determines the braking force $F_{ira}$ at the onset of ABS control, and block 362 sets the inside front force command $F_{if}$ to the difference $(F-F_{ira})$. If ABS is not activated, block 364 sets the inside front force command $F_{if}$ to the difference $(F-F_{ir})$. If there is driver braking, and ABS control is activated for both front and rear inside wheels, as determined at blocks 366–368, block 370–374 are executed to determine a braking force command $F_{of}$ for the outside front wheel, which represents the amount of reduction in braking force from the driver requested braking force. The command $F_{of}$ is determined by determining the actual braking forces $F_{ifa}$ and $F_{ira}$ developed at the inside front and rear wheels, and computing the difference $(F-F_{ifa}-F_{ira})$. This difference cannot be negative, and is limited at block 374 to 50% of the driver commanded brake force $Bf_{of}$ for the outside front wheel.

In the oversteer condition, the brake force command $F_{of}$ for the outside front wheel is set to the total corrective force F at block 376. If there is no driver braking, as determined at block 378, the block 380 is executed to override any ABS activation for the outside front wheel. If there is driver braking, and ABS control is activated for the outside front wheel, as determined at blocks 378 and 382, the blocks 384–386 are executed to determine the actual braking force $F_{ofa}$ at the outside front wheel, and to set the brake force command $F_{if}$ for the inside front wheel equal to the difference $(F-F_{ofa})$. If the outside front wheel is allowed to lock, the effect of reduction in lateral force on the vehicle yaw moment is included in the calculation of $F_{ofa}$. The difference $(F-F_{ofa})$ cannot be negative, and is limited at block 388 to 50% of the driver commanded brake force $BF_{if}$ for the inside front wheel. Block 390 then sets the brake force command $F_{ir}$ for the inside rear wheel equal to the difference $(F-F_{ofa}-F_{ifa})$ Again, the difference cannot be negative, and is limited at block 392 to 50% of the driver commanded brake force $BF_{ir}$ for the inside rear wheel.

It will be understood that in the oversteer condition with driver braking, the brake force commands $F_{if}$ and $F_{ir}$ for the front and rear inside wheels represent a commanded reduction in braking force at such wheels. Similarly, in the understeer condition with driver braking, the brake force command $F_{of}$ for the front outside wheel represents a commanded reduction in braking force at such wheel.

While this invention has been described in reference to the illustrated embodiment, it is anticipated that various modifications will occur to those skilled in the art, and that brake controls incorporating such modifications may fall within the scope of the present invention. Accordingly, the scope of the present invention is not limited by the illustrated embodiment, but rather, by the appended claims.

What is claimed is:

1. An active brake control method utilizing differential braking of vehicle wheels to impart a desired yaw moment on the vehicle, the method comprising the steps of:

measuring longitudinal speed, yaw rate, lateral acceleration and steering angle of the vehicle;

estimating a time rate of change of lateral velocity of the vehicle based on the measured yaw rate, lateral acceleration and steering angle, and an initial estimation of lateral bank acceleration due to banking of a road surface;

updating the estimated bank acceleration based on the time rate of change of lateral velocity and the measured longitudinal speed, yaw rate and lateral acceleration;

compensating the measured lateral acceleration and steering angle based on the updated estimated lateral bank acceleration to form lateral acceleration and steering angle values that are compensated for the effects of the banking of the road surface;

determining a desired yaw rate for the vehicle based on the compensated lateral acceleration and steering angle values and the measured longitudinal speed using a reference model of the vehicle; and computing the desired yaw moment based on a deviation of said measured yaw rate from said desired yaw rate.

2. The active brake control method of claim 1, wherein the step of estimating a time rate of change of lateral velocity includes the steps of:

estimating the lateral velocity based on the measured yaw rate, lateral acceleration and steering angle, and the estimate of lateral bank acceleration, using a nonlinear dynamic observer; and high pass filtering the estimated lateral velocity to estimate the time rate of change of the estimated lateral velocity.

3. The active brake control method of claim 2, wherein the nonlinear dynamic observer is also used to estimate a slip angle of the vehicle, the reference model is also used to determine a desired slip angle of the vehicle and the desired lateral acceleration, and the desired yaw moment is based in part on a deviation of the estimated slip angle from the desired slip angle.

4. The active brake control method of claim 3, including the steps of:

estimating a lateral surface coefficient of adhesion of the vehicle based on the measured yaw rate and longitudinal speed and the compensated lateral acceleration; and limiting the desired slip angle based on the estimated lateral surface coefficient of adhesion.

5. The active brake control method of claim 1, wherein the desired yaw moment is additionally based on an estimate of a lateral surface coefficient of adhesion of the vehicle, the control method including the additional step of:

estimating the lateral surface coefficient of adhesion of the vehicle based on the measured yaw rate and longitudinal speed and the compensated lateral acceleration.

6. The active brake control method of claim 1, wherein the initial estimated lateral bank acceleration is updated according to the sum of the estimated time rate of change of lateral velocity and a product of the measured vehicle speed and yaw rate, less the measured lateral acceleration.

7. The active brake control method of claim 6, including the steps of:

determining if the vehicle is in a transient condition or a steady state condition;

low pass filtering the updated estimate of lateral bank acceleration with a first gain when it is determined that the vehicle is in a steady state condition; and low pass filtering the updated estimate of lateral bank acceleration with a second gain which is lower than said first gain when it is determined that the vehicle is in a transient condition.

8. The active brake control method of claim 7, wherein the transient condition is detected when a magnitude of said deviation between measured and desired yaw rates or a magnitude of a time rate of change of a desired lateral acceleration exceed respective thresholds.

9. The active brake control method of claim 1, wherein the measured lateral acceleration is compensated for the effects of the banking of the road surface by increasing the measured lateral acceleration by the estimated lateral bank acceleration.

10. The active brake control method of claim 1, wherein the measured steering angle is compensated for the effects of the banking of the road surface by decreasing the measured steering angle by a product of the estimated lateral bank acceleration and a desired understeer factor.

* * * * *